J. V. BROWNLEE.
DEMOUNTABLE TIRE RIM.
APPLICATION FILED AUG. 15, 1919.
1,338,067.
Patented Apr. 27, 1920.
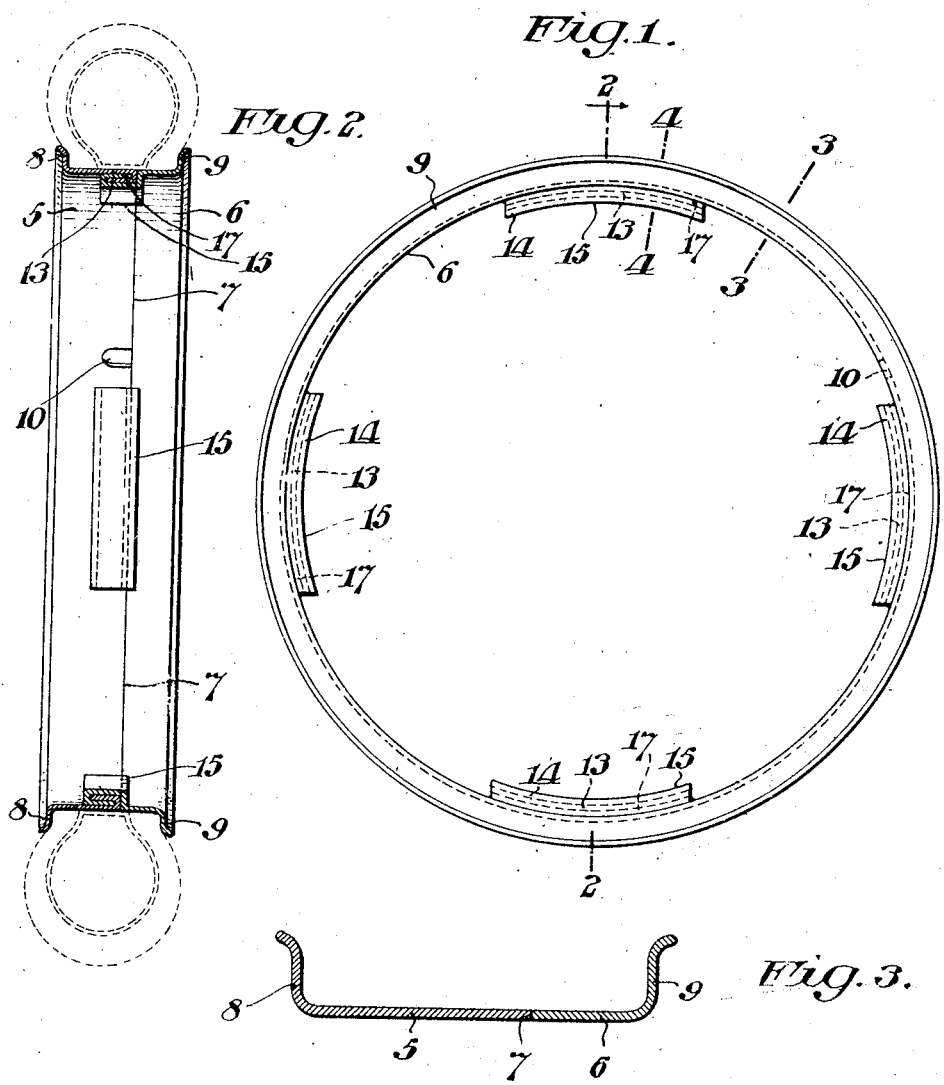
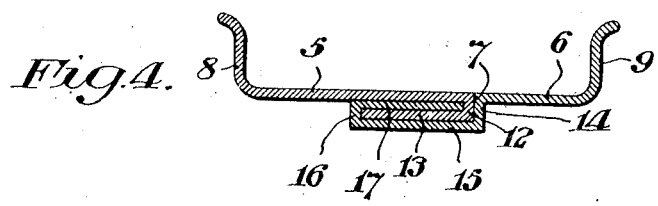
Inventor:
John Verner Brownlee
By Jas. C. Wobensmith
Attorney

UNITED STATES PATENT OFFICE.

JOHN VERNER BROWNLEE, OF PHILADELPHIA, PENNSYLVANIA.

DEMOUNTABLE TIRE-RIM.

1,338,067.　　　　Specification of Letters Patent.　　Patented Apr. 27, 1920.

Application filed August 15, 1919. Serial No. 317,704.

*To all whom it may concern:*

Be it known that I, JOHN VERNER BROWNLEE, a citizen of the United States, residing at Philadelphia, in the county of Philadelphia and State of Pennsylvania, have invented certain new and useful Improvements in Demountable Tire-Rims, of which the following is a specification.

My invention relates to demountable tire rims, that is to say, to rims upon which vehicle tires are mounted and which are adapted to be disassociated from the wheel. My invention relates more particularly to a demountable tire rim which is made in separable parts to facilitate the mounting and demounting of the tire with respect thereto.

The principal object of my invention is to provide a rim of the above mentioned type which is so constructed and arranged whereby the tire may be quickly and easily mounted thereon or demounted therefrom when desired for the purpose of making repairs or changes, which tire rim may be easily and inexpensively manufactured, and which may be readily and conveniently manipulated by the user for the above mentioned purpose, namely, the mounting or demounting the tire with respect thereto.

The nature and characteristic features of my invention will be more readily understood from the following description taken in connection with the accompanying drawings forming part hereof, in which, Figure 1 is a side elevation of a demountable tire rim embodying the main features of my present invention;

Fig. 2 is a vertical central section thereof taken on the line 2—2 of Fig. 1;

Fig. 3 is a transverse section, enlarged, of the rim, taken on the line 3—3 of Fig. 1; and Fig. 4 is a similar view taken on the line 4—4 of Fig. 1.

Referring to the drawings, in the particular embodiment of my invention therein shown, the rim comprises two annular sections 5 and 6 abutting at their inner margins as at 7. The line of jointure is preferably arranged to one side of the medial plane of the assembled structure. The two annular sections 5 and 6 are respectively provided with side-flanges 8 and 9 which are of a contour complemental to the shape of the base of the tire in connection with which the rim is to be used. The flanges 8 and 9 of the rim sections 5 and 6 as shown in the drawings are of a shape which is used in connection with what are known as "straight-side" tires, but it will, of course, be understood that other shapes of the flanges 8 and 9 may be provided where the tire in connection with which the tire rim is used has a different form of base. The rim section 5, which is of the greater width, is also usually provided with a cut-out portion 10 to permit the passage of the tire nipple when the tire is placed on the rim.

The rim section 5, which is of the greater width, is provided with a plurality of integral sector members which extend first inward toward the center of the rim as at 12 and thence pass backward parallel to the body of the rim section 5 to form tongues 13, which however, are arranged contiguous to but at a slight distance away from the inner surface of the rim section 5. The rim section 6, which is of the narrower width, is also provided at complemental locations with integral sector members which extend first inward as at 14, thence extending as at 15 along the inner side of the tongues 13 of the rim section 5, thence extending as at 16 around the ends of the tongues 13, and thence extending backward into the space formed between the tongue 13 and the inner side of the rim section 5 to form tongues 17 which interlock with the tongues 13 of rim section 5.

It will thus be seen that the rim sections 5 and 6 are provided with a plurality of complemental interlocking tongues or projections, which, when the two sections are properly assembled will effectually prevent the sidewise separation of the two sections 5 and 6. The circumferential extent of each of the interlocking sector members of the two rim sections 5 and 6 is less than the respective distances between adjacent locking sectors, so it will be readily seen that by shifting the two sections 5 and 6 circumferentially with respect to each other, the interlocking tongues will be brought to such positions as to disengage and permit the separation of the two sections 5 and 6 from each other, whereby the tire may then be readily placed in position on the rim. The two parts being then brought together and rotated with respect to each other to cause the interlocking tongues of the rim sections 5 and 6 to engage each other, the two sections will thereby be securely locked together and thus maintain the tire in place on the rim.

It will be noted that a tire rim constructed as above described may be mounted on the usual wheel felly, and is adapted to be held in place by means of the usual wedges or other devices which are used in connection with the demountable tire rims of unitary form which are at present in general use. It will also be noted that while the present invention is applicable for use in connection with both pneumatic and solid tires of the common types, it is also particularly adaptable for use in connection with tires having inextensible beads.

Having thus described the nature and characteristic features of my invention what I claim as new and desire to secure by Letters Patent is:

1. A demountable tire rim comprising two annular sections having abutting margins and each provided with a tire retaining flange, one of said sections being provided with a plurality of sector members extending back from the abutting margin of said rim contiguous to the body of said section, and the other of said sections being provided with a plurality of complemental sector members extending around the first mentioned sector members and having portions projecting between said first mentioned sector members and the body of the rim section to which they are attached.

2. A demountable tire rim comprising two annular sections having abutting margins and each provided with a tire retaining flange, one of said sections being provided with a plurality of sector members extending back from the abutting margin of said rim contiguous to the body of said section, and the other of said sections being provided with a plurality of complemental sector members extending around the first mentioned sector members and having portions projecting between said first mentioned sector members and the body of the rim section to which they are attached, said sector members being adapted to disengage each other when the rim sections are rotated with respect to each other.

3. A demountable tire rim comprising two annular sections having abutting margins and each provided with a tire retaining flange, one of said sections being provided with a plurality of integral sector members extending back from the abutting margin of said rim contiguous to the body of said section, the other of said sections being provided with a plurality of complemental integral sector members extending around the first mentioned sector members and having portions projecting between said first mentioned sector members and the body of the rim section to which they are attached, and said sector members being of a circumferential extent less than the respective distances therebetween.

4. A demountable tire rim comprising two annular sections having abutting margins and each provided with a tire retaining flange, one of said sections being provided with a plurality of integral sector members extending back from the abutting margin of said rim contiguous to the body of said section, the other of said sections being provided with a plurality of complemental integral sector members extending around the first mentioned sector members and having portions projecting between said first mentioned sector members and the body of the rim section to which they are attached, said sector members being of a circumferential extent less than the respective distances therebetween, one of said rim sections being wider than the other, and the wider section having a cut out portion to permit the insertion of the tire nipple.

In testimony whereof, I have hereunto signed my name.

JOHN VERNER BROWNLEE.